United States Patent
Wolf

[11] 4,190,127
[45] Feb. 26, 1980

[54] BRAZING INSERTS

[76] Inventor: Isaac M. Wolf, 18 Hollinger Ave., Springs, Transvaal, South Africa

[21] Appl. No.: 870,807

[22] Filed: Jan. 19, 1978

[30] Foreign Application Priority Data

Jan. 20, 1977 [ZA] South Africa .................. 77/0339

[51] Int. Cl.² .............................................. B23K 1/04
[52] U.S. Cl. .................... 175/410; 175/414; 228/134; 76/101 R
[58] Field of Search ................. 228/131–134; 76/101 R, 101 A; 30/168; 175/414–418, 410

[56] References Cited

U.S. PATENT DOCUMENTS

| | | | |
|---|---|---|---|
| 2,101,376 | 12/1937 | Voigtland | 30/168 X |
| 2,628,072 | 2/1953 | Baker | 175/418 X |
| 2,707,619 | 5/1955 | Anderson | 175/414 X |
| 2,890,021 | 6/1959 | Sandvig | 175/418 X |
| 3,027,953 | 4/1962 | Coski | 175/414 X |
| 3,205,573 | 9/1965 | Seal et al. | 228/132 |
| 3,268,259 | 8/1966 | Snipe | 175/410 X |

*Primary Examiner*—Francis S. Husar
*Assistant Examiner*—K. J. Ramsey
*Attorney, Agent, or Firm*—Young & Thompson

[57] ABSTRACT

This invention relates to a method of brazing a hard metal insert into a recess in the bit of a rock working tool and to a tool produced by the method. The method includes the steps of shaping both the underside of the insert and the base of the recess to a tapered point with an angle of taper of about 130°, placing the insert, which is a loose fit in the recess, so that the base of the bit fits complementally into the tapered base of the recess to centralize the insert in the recess and causing a moulten brazing medium to flow into the recess between its walls and those of the insert.

11 Claims, 1 Drawing Figure

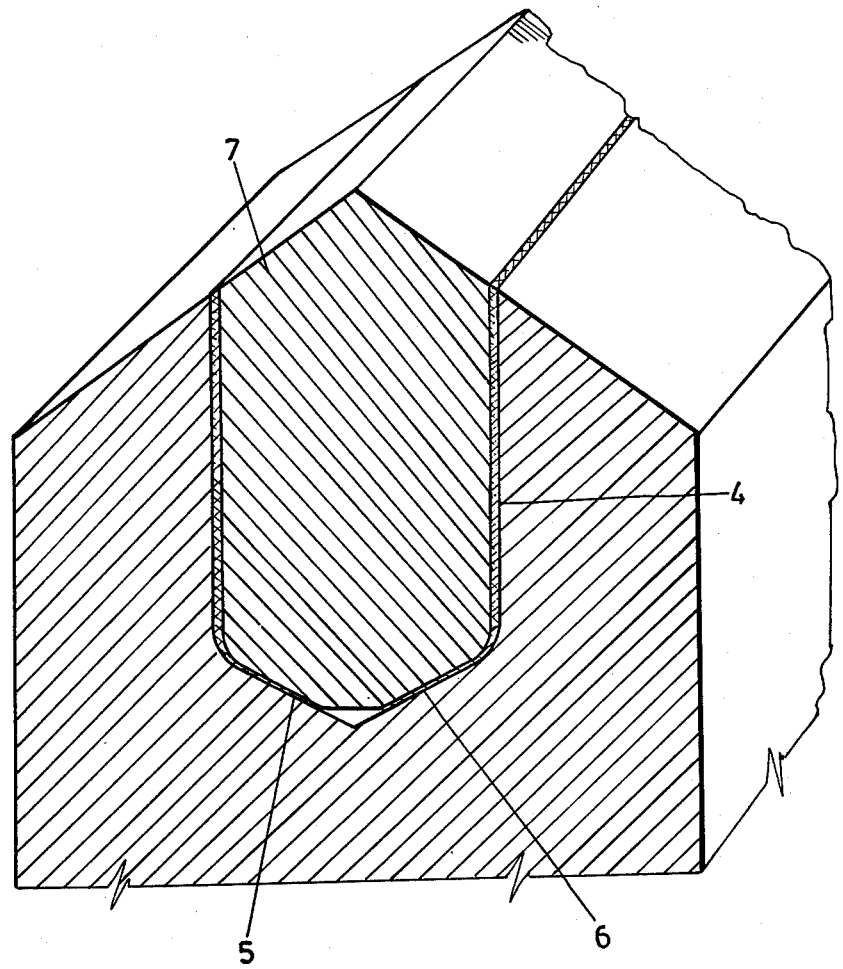

BRAZING INSERTS

BACKGROUND OF THE INVENTION

This invention relates to the brazing of inserts into recesses such as slots and holes in implements such as rock working tools and to an implement into which an insert has been brazed.

Conventionally in rock working tools an insert such as a hard metal insert, is brazed into position after first positioning it in a recess in the bit portion of the tool in which it is a free fit. In order to ensure that the insert is properly spaced from the walls of the recess a spacer, which has a higher melting point than, and limited solubility in the brazing medium, may be inserted between the slot walls and the insert. Alternatively dimples may be gouged out of the wall of the recess to serve as spacing projections.

SUMMARY OF THE INVENTION

According to the invention a method of brazing an insert into a recess comprises the steps of shaping the bottom of the recess and the base of the insert with complemental concave and convex shapes to provide automatic spacing of the insert when it is positioned in the recess, positioning the insert in the recess with the recess facing vertically upwardly, and causing molten brazing medium to flow into the spaces between the insert and the recess.

The invention further provides that the floor of the recess be formed with a downward taper toward the center of the base where an angle of between 100° and 170° is made between the converging surfaces of the base and forming the base of the insert with a complemental taper to its center. An angle of about 130° between the converging surfaces of the bases of both the recess and insert has been found to work well.

According to the invention there is provided a rock working tool including a recess having a substantially concave base and a hard metal insert having a base which is substantially complementally shaped to the base of the recess and which is brazed into the recess with a greater thickness of brazing material between at least two sides of the insert and the recess than between the base of the insert and recess.

In one form of the invention the floor of the recess is formed with a taper toward its center and the base of the insert with a complemental taper. Conveniently the angle of taper is between the converging surfaces of the base of the recess and the base of the insert is 100° and 170° and preferably about 130°.

Further according to the invention the recess is a slot and both the slot and insert are parallel sided with gabled bases. The tip of the insert in the slot may be truncated.

BRIEF DESCRIPTION OF THE DRAWING

It is a section through an insert and recess assembly in a bit of a rock working tool after the insert has been brazed into the recess.

DESCRIPTION OF A PREFERRED EMBODIMENT

The drawing shows the bit end of a drill steel formed with a slot 4. The bottom of the slot is formed with a downward taper. As shown the angle is about 130° between the base parts 5 and 6.

A hard metal insert 7 is seated in the slot 4. Its base is complementally tapered or gabled so that the insert 7 sits centrally in the slot 4. Note that to facilitate nesting the tip of the taper on the insert 7 is truncated.

Also where the sides and bases meet there is a smooth curvature.

In use the insert is positioned as shown and the brazing medium applied in the conventional manner. The brazing medium flows into the spaces between the side wall of the slot and the insert and percolates, probably by capillary action, into the contact areas below the insert. Because the insert is transversely an easy or loose fit in the slot and the base of the insert initially rests on the base of the slot there is, after brazing, a greater thickness of brazing material between the sidewalls of the recess and slot than between the base of the insert and recess.

For brazing, say, cylindrical inserts into cylindrical holes, the holes are formed with conical depressions and the bases of the inserts with truncated conical ends complemental to the recesses.

TEST RESULTS

A number of rock drill stems with integral bits were made with chisel-shaped inserts 7 secured in position by the method described above.

These were tested under actual mining conditions against the same number of standard drill rods in which the inserts were brazed in flat bottom slots with the use of spacers.

The test and control rod dimensions were:

22 mm × 1,4 m × 28 mm

|  | Test Rods | Control Rods |
| --- | --- | --- |
| Total meters drilled | 13 752 | 11 293 |
| Rods discarded | 24 | 25 |
| Av. meters/rod | 573 | 452 |

The above indicates a marked superiority of test rods over control rods.

I claim:

1. A rock working tool having a bit portion having a recess for a cutting insert with the floor of the recess being formed with a downward taper to the center, and a hard metal insert having a base which is complementally tapered to the base of the recess brazed into the recess with a greater thickness of brazing material between at least two opposite sides of the insert and the recess than between the bases of the insert and recess.

2. A tool as claimed in claim 1 in which the angle between the converging surfaces of the base of the recess and insert is between 100° and 170°.

3. A tool as claimed in claim 2 in which the angle between the converging surfaces is about 130°.

4. A tool as claimed in claim 1 in which the recess is a slot and both the insert and slot are parallel-sided with gabled bases.

5. A tool as claimed in claim 4 in which the angle between the converging surfaces of the bases of both the slot and the insert is between 100° and 170°.

6. A tool as claimed in claim 5 in which the angle between the converging surfaces is about 130°.

7. A tool as claimed in claim 5 in which the apex of the base of the insert is flat.

8. A tool as claimed in claim 1 in which the corners between the bases and side walls of both the recess and the insert are rounded.

9. A tool as claimed in claim 1 in which the bit portion of the tool is chisel-shaped.

10. A tool as claimed in claim 1 in which the tool is a rock drill.

11. A method of brazing a parallel-sided insert for a rock working tool into a parallel-sided recess in the tool including the steps of shaping the base of the recess and the base of the insert to complemental gabled shapes so that when the insert is located in the recess, the insert is automatically centrally located in the recess, positioning the insert in the recess with the base of the insert resting on the base of the recess so that the insert is gravitationally centered in the recess, and causing molten brazing medium to flow into the spaces between the insert and recess to hold the insert in the recess.

* * * * *